F. B. MARTIN.
CARTON FEEDING DEVICE.
APPLICATION FILED OCT. 7, 1912.

1,101,651.

Patented June 30, 1914.
3 SHEETS—SHEET 1.

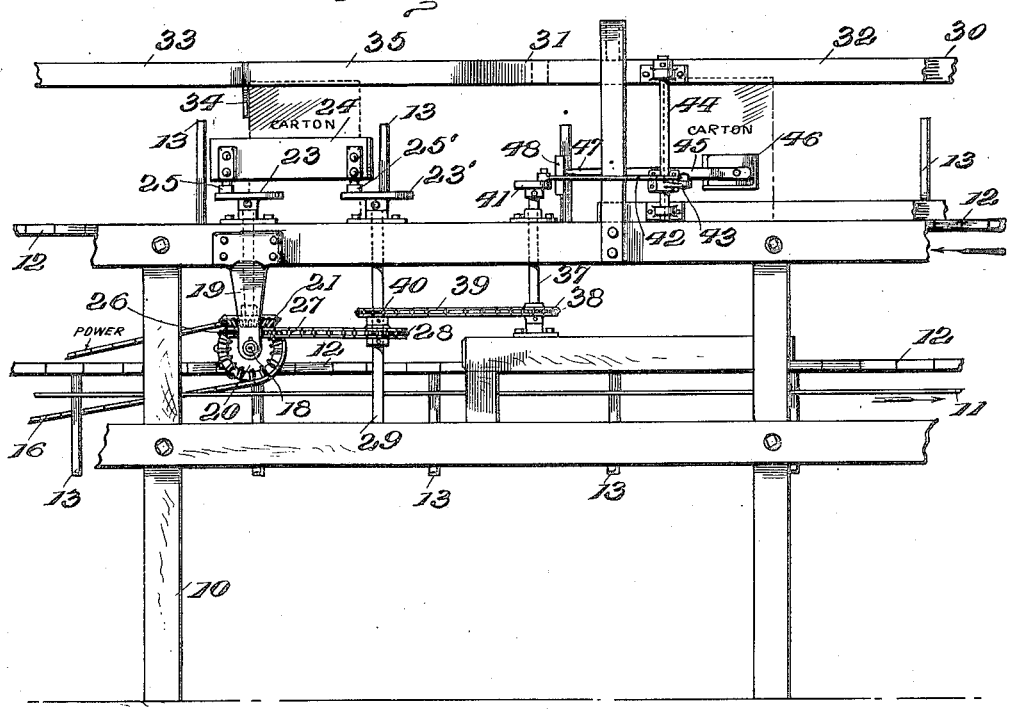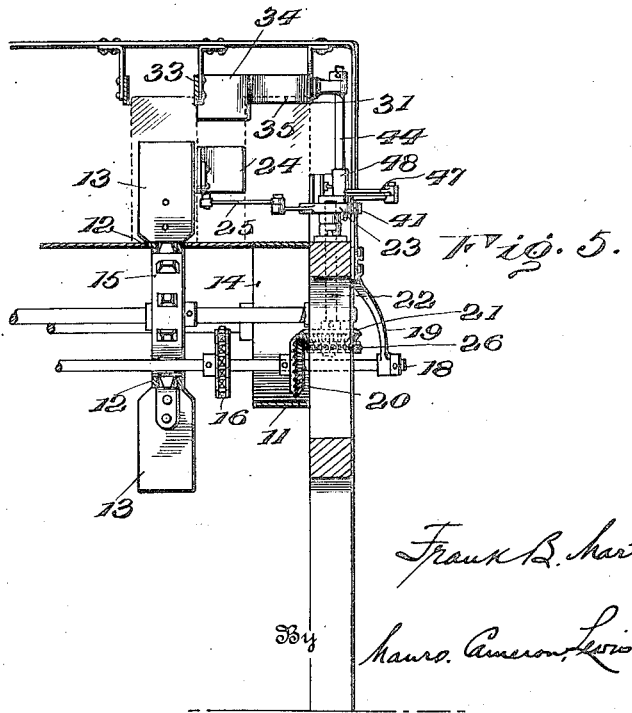

F. B. MARTIN.
CARTON FEEDING DEVICE.
APPLICATION FILED OCT. 7, 1912.

1,101,651.

Patented June 30, 1914.

3 SHEETS—SHEET 3.

Witnesses
R. C. Fitzhugh
S. E. Warfield

Inventor
Frank B. Martin
By Mauro, Cameron, Lewis & Massie
Attorneys

UNITED STATES PATENT OFFICE.

FRANK B. MARTIN, OF BATTLE CREEK, MICHIGAN, ASSIGNOR TO POSTUM CEREAL CO., LIMITED, OF BATTLE CREEK, MICHIGAN.

CARTON-FEEDING DEVICE.

1,101,651. Specification of Letters Patent. Patented June 30, 1914.

Application filed October 7, 1912. Serial No. 724,342.

*To all whom it may concern:*

Be it known that I, FRANK B. MARTIN, of Battle Creek, Michigan, have invented a new and useful Improvement in Carton-Feeding Devices, which invention is fully set forth in the following specification.

The present invention is an improvement in carton shifting or feeding devices, and has for its object to provide a simple and efficient mechanism for accurately and rapidly shifting cartons from one conveyer into engagement with another, and for controlling the movement of the cartons on one of said conveyers. As herein shown the invention is associated with a conveyer that moves the cartons from the carton-filling mechanism, the said cartons being shifted from said conveyer into engagement with a second conveyer that carries them to the glue-applying and sealing mechanism or mechanisms. Each of the cartons on the conveyer that moves them from the fillers is stopped one or more times by suitable mechanism in order that said cartons may be suitably spaced apart when they are engaged by the mechanism that shifts them laterally from said conveyer into engagement with the second conveyer that carries them to the glue-applying and sealing mechanism.

Figure 6:
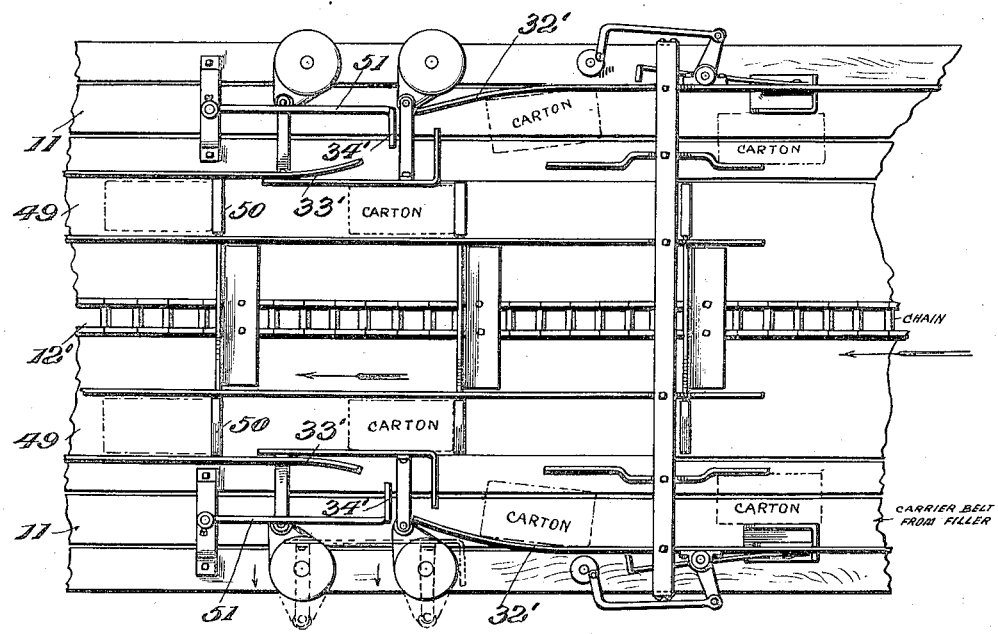
Figure 7:
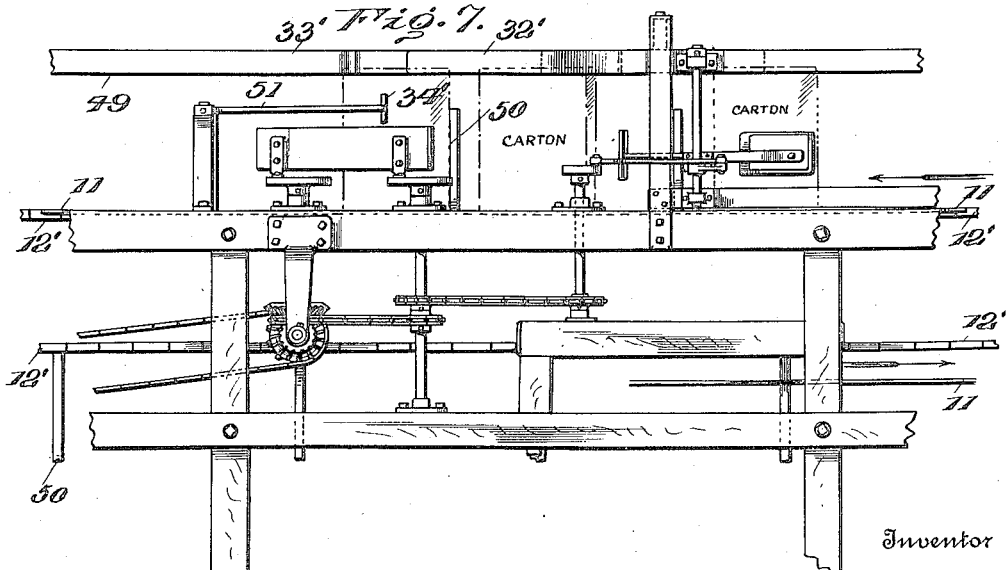

The invention will be better understood by reference to the accompanying drawings, illustrating one expression of the inventive idea, and wherein, Figure 1 is a plan view of part of a single machine showing the carton controlling means and the carton shifting means in one position; Fig. 2 is a similar view showing the parts in another position; Fig. 3 is a perspective view, with some of the parts removed, showing the driving connections, the guides for the cartons, and the carton controlling means and the carton shifting means; Fig. 4 is a side elevation of the mechanism shown in Figs. 1, 2 and 3; Fig. 5 is an end elevation, looking toward the right in Fig. 4; Fig. 6 is a plan view of part of a double machine equipped with the invention; and Fig. 7 is a side elevation of said machine.

Referring to the drawings, wherein like reference numerals indicate like parts, 10 indicates any suitable framework of a carton handling machine on which is mounted in any desired manner a conveyer 11, here shown as a belt conveyer, and a conveyer 12, here shown as a chain conveyer, the latter being provided at suitable intervals with followers 13. The belt conveyer passes around pulleys 14 and the chain conveyer around sprocket wheels 15, one of said pulleys and one of said sprocket wheels being shown in Fig. 5. Said conveyers are driven in any usual or desired manner.

Movable means are provided for controlling the movement of the cartons that are carried by the belt conveyer 11 and also for laterally shifting the cartons from belt conveyer 11 into engagement with chain conveyer 12, and said movable means are driven in any suitable manner. As here shown, a sprocket chain 16 is connected to any suitable source of power, and passes around a sprocket wheel 17 keyed on a shaft 18 which latter is mounted in suitable hangers 19, one of which is shown in Fig. 3. There is also keyed to said shaft 18 a bevel gear 20 which meshes with a similar bevel gear 21 carried by one end of a vertical shaft 22 suitably mounted in the machine frame. On the other end of said vertical shaft 22 is mounted a crank 23 which is connected to the carton shifting element or pusher 24 by means of a pitman or connecting rod 25. By reason of this connection the pusher 24 is caused to move transversely of said belt conveyer 11 and to laterally shift the cartons from said belt 11 into engagement with the followers 13 on chain conveyer 12. Preferably the pusher 24 is operated by two cranks, rotating at the same speed and having like connections with said pusher, and as here shown there is provided on the lower end of vertical shaft 22 a sprocket wheel 26 around which passes a sprocket chain 27 which latter also engages a sprocket wheel 28 keyed on the lower end of a second vertical shaft 29 suitably mounted in the frame of the machine. To the upper end of shaft 29 is secured crank 23′ which in turn is connected to pusher 24 by pitman or connecting rod 25′.

As the cartons are conveyed from the fillers on belt conveyer 11, they pass between guides 30 and 31, the latter being provided with a section 32 parallel and adjacent to belt conveyer 11, a section 33 parallel and adjacent to chain conveyer 12, a section 34, constituting a stop, arranged at right angles to conveyers 11 and 12, and a section 35 connecting sections 32 and 34, said section 35 passing diagonally over conveyer 11. The guide 30 is provided with an offset 36, preferably of 45 degrees, (Fig. 3) and each carton carried by conveyer 11 is engaged at an appropriate time by suitable mechanism that shifts it laterally into engagement with said offset 36, thus for a moment stopping said carton. After this momentary stopping the carton is again moved forward by belt conveyer 11, and is a second time stopped by a suitable device. The cartons are thus suitably spaced on the conveyer 11 in order that they may be separately and properly engaged by the pusher 24. Any suitable means for controlling the movement of the cartons on belt conveyer 11 may be employed, but preferably that shown herein is utilized.

Referring particularly to Fig. 3, 37 is a vertical shaft suitably mounted in the machine frame, to the lower end of which shaft is keyed a sprocket wheel 38 which is engaged by a sprocket chain 39 which also passes around a sprocket chain 40 keyed to shaft 29. The connections between shafts 22, 29 and 37 are such that they all rotate at the same speed. To the upper end of said shaft 37 is secured a disk 41 to which is eccentrically connected one end of a link 42, the other end of said link being connected to an arm 43 which latter is fixedly secured to a vertical shaft 44 mounted on the frame of the machine. A two-armed lever is suitably connected to arm 43, one arm 45 of said lever having connected thereto a member 46 which engages the side of each carton and forces it into engagement with offset 36, and the other arm 47 of said lever being provided with a stop 48 arranged at right angles thereto, said stop 48 being moved into and out of the path of movement of the cartons on conveyer 11.

The operation of the device as thus far described is as follows: The machine having been started, a stream of cartons is fed from the fillers on to belt conveyer 11 which carries said cartons forward toward the glue-applying and sealing mechanism. As each carton arrives opposite member 46 the latter is moved into engagement with the side of said carton, shifting the same laterally into engagement with the offset 36 and momentarily stopping said carton. As member 46 oscillates away from the carton thus displaced, the moving belt conveyer 11 causes it to become disengaged from offset 36 and carries it forward until it is again immobilized by stop 48 which has been oscillated into the path of movement of said carton. As stop 48 is oscillated out of the path of movement of said carton, member 46 is moved to engage the succeeding carton to shift it into engagement with offset 36. After the carton passes stop 48 it is carried forward by belt conveyer 11 and, by reason of the fact that section 35 of guide 31 projects diagonally across belt conveyer 11, said carton is not only moved forward by said belt 11 but is shifted laterally by said guide until it comes into engagement with stop 34, as shown in dotted lines in Fig. 2, it being understood that, when said carton is in engagement with that portion of the guide in front of pusher 24, the latter has been withdrawn to the position shown in full lines in Fig. 2. The pusher 24 then moves forward into engagement with said carton, shifting the same until it is parallel with chain conveyer 12 and maintaining it in this position until it is engaged by the appropriate follower 13 on conveyer 12. Each succeeding carton is subjected to the same operation with the result that a stream of cartons is rapidly carried from the fillers, expeditiously spaced on belt conveyer 11, and then rapidly and accurately shifted laterally so that each carton is engaged by the proper follower 13 carried by chain conveyer 12.

In Figs. 6 and 7, the device heretofore described is illustrated as applied to a double machine, that is to say, a machine provided with two belt conveyers 11 leading from the fillers, instead of a single belt conveyer, and having a carton controlling and shifting device associated with each belt conveyer. Further, instead of a single conveyer being provided for moving the cartons to the glue-applying and sealing devices, a conveyer 49 is arranged parallel and adjacent to each belt conveyer 11, followers 50 carried by chain 12' projecting over said conveyers 49 and engaging the cartons carried thereon. In addition, the guide that corresponds to guide 31 of Figs. 1–5, inclusive, is of a slightly different construction, it being constituted by independent sections 32' and 33' and an independent stop 34' the latter being mounted on an arm 51 secured to the machine frame. When the device is applied to a double machine, the driving connections illustrated particularly in Fig. 3 are duplicated on the other side of the machine, with the result that the two devices act to simultaneously shift the cartons from conveyers 11 into engagement with conveyers 49 which carry them forward to the glue-applying and sealing mechanisms.

As will be apparent, the invention is not restricted to the particular structural embodiment thereof illustrated and described, but is susceptible of a variety of embodiments conforming to the definition of the invention given in the claims which follow.

What I claim is:—

1. In combination, a conveyer for cartons, movable means engaging each carton and stopping the same, a second conveyer arranged beside and substantially parallel with the first conveyer, and means moving said cartons from the first-named into engagement with the second-named conveyer.

2. In combination, a conveyer for cartons, pivoted means engaging each carton and stopping the same, a second conveyer arranged beside and substantially parallel with the first conveyer, and means moving said cartons from the first-named into engagement with the second-named conveyer.

3. In combination, a conveyer for cartons, movable means engaging each carton and stopping the same a plurality of times, a second conveyer arranged beside and substantially parallel with the first conveyer, and means moving said cartons from the first-named into engagement with the second-named conveyer.

4. In combination, a conveyer for cartons, pivoted means engaging each carton and stopping the same a plurality of times, a second conveyer arranged beside and substantially parallel with the first conveyer, and means moving said carton from the first-named into engagement with the second-named conveyer.

5. In combination, a power conveyer for cartons, a two-armed pivoted lever, means moving each arm into engagement with each carton, a second power conveyer arranged beside and substantially parallel with said first conveyer, and means moving said cartons from the first-named into engagement with the second-named conveyer.

6. In combination, a power conveyer for cartons, a two-armed pivoted lever, carton-engaging means carried by each arm, operating means for said lever, a second power conveyer arranged beside and substantially parallel with the first conveyer, and means moving said cartons from the first-named into engagement with the second-named conveyer.

7. In combination, a power conveyer for cartons, a two-armed pivoted lever, means engaging a side of each carton carried by one arm, and means projecting into the path of the cartons carried by the other arm, operating means for said lever, a second power conveyer, and means moving said cartons from the first-named into engagement with the second-named conveyer.

8. In combination, a conveyer for cartons, a guide provided with an offset associated therewith, movable means engaging each carton and holding it in engagement with said offset, a second conveyer, and means moving said cartons from the first-named into engagement with the second-named conveyer.

9. In combination, a conveyer for cartons, a guide provided with an offset associated therewith, pivoted means engaging each carton and holding it in engagement with said offset, a second conveyer, and means moving said cartons from the first-named into engagement with the second-named conveyer.

10. In combination, a conveyer for cartons, a guide for said cartons extending diagonally across said conveyer, a second conveyer substantially parallel with the first-named conveyer, and means shifting said cartons into engagement with said second-named conveyer.

11. In combination, a conveyer for cartons, a guide for said cartons extending diagonally across said conveyer, a second conveyer substantially parallel with the first-named conveyer and crank-operated means shifting said cartons into engagement with said second-named conveyer.

12. In combination, a conveyer for cartons, oscillating means moving horizontally and stopping each carton, a second conveyer arranged beside and substantially parallel with the first conveyer, and means shifting said cartons into engagement with said second conveyer.

13. In combination, a conveyer for cartons, oscillating means moving horizontally and stopping each carton a plurality of times, a second conveyer arranged beside and substantially parallel with the first conveyer, and means shifting said cartons into engagement with said second conveyer.

14. In combination, a power conveyer for cartons, a guide for said cartons extending diagonally across said conveyer, oscillating means moving horizontally and stopping each carton, a second power conveyer arranged beside and substantially parallel with the first conveyer, and means shifting said cartons into engagement with said second conveyer.

In testimony whereof I have signed this specification in the presence of two subscribing witnesses.

FRANK B. MARTIN.

Witnesses:
ARTHUR R. WILLIAMS,
VERN D. SUTTON.